United States Patent [19]
Yamamoto

[11] Patent Number: 4,949,673
[45] Date of Patent: Aug. 21, 1990

[54] DOMESTIC PETS CHAMBERPOT

[76] Inventor: Yoshikazu Yamamoto, 3-1-1, Eganosho, Habikino-shi, Osaka, Japan

[21] Appl. No.: 420,766

[22] Filed: Oct. 12, 1989

[30] Foreign Application Priority Data

Nov. 12, 1988 [JP] Japan .................. 63-147976[U]

[51] Int. Cl.$^5$ ............................................. A01K 29/00
[52] U.S. Cl. ................................... 119/1; 4/300.1; 4/661
[58] Field of Search ............... 4/449, 445, 479, 661, 4/239, 420.3, 484, 300–300.1; 119/1

[56] References Cited

U.S. PATENT DOCUMENTS

| | | | |
|---|---|---|---|
| 3,735,735 | 5/1973 | Norolan | 4/484 X |
| 3,809,013 | 5/1974 | rigney et al. | 119/1 |
| 3,827,401 | 8/1974 | Franzl | 4/484 X |
| 4,279,217 | 7/1981 | Behringer | 4/484 X |
| 4,779,567 | 10/1988 | Smith | 119/1 |

FOREIGN PATENT DOCUMENTS

| | | | |
|---|---|---|---|
| 1198638 | 12/1985 | Canada | 119/1 |
| 2602643 | 2/1988 | France | 119/1 |
| 446405 | 4/1936 | United Kingdom | 119/1 |

Primary Examiner—Henry K. Artis
Attorney, Agent, or Firm—Moonray Kojima

[57] ABSTRACT

This invention is concerned with a chamberpot for domestic pets such as dogs and cats, which employs a water-absorptive sheet as placed on a soil bed. The soil bed is surrounded by peripheral walls, one of which is continuous with a sheet containing section for storing a plurality of sheets in a manner to allow the sheets to be drawn therefrom. The above wall defines a sheet drawout position for guiding the sheet from the sheet containing section to the soil bed. A clamp device is provided which has a frame shape corresponding to the soil bed, and defines a sheet pressing portion on bottom peripheral faces thereof for pressing a sheet on peripheries of the soil bed. This chamberpot facilitates changing of the sheet placed on the soil bed.

2 Claims, 4 Drawing Sheets 4,949,673

DOMESTIC PETS CHAMBERPOT

SUMMARY OF THE INVENTION

This invention is concerned with a chamberpot for domestic pets such as dogs and cats, which employs a water-absorptive sheet as placed on a soil bed. The soil bed is surrounded by peripheral walls, one of which is continuous with a sheet containing section for storing a plurality of sheets in a manner to allow the sheets to be drawn therefrom. The above wall defines a sheet draw-out position for guiding the sheet from the sheet containing section to the soil bed. A clamp device is provided which has a frame shape corresponding to the soil bed, and defines a sheet pressing portion on bottom peripheral faces thereof for pressing a sheet on peripheries of the soil bed. This chamberpot facilitates changing of the sheet placed on the soil bed.

DESCRIPTION OF THE PRIOR ART

Conventionally, the sheets employed for a chamberpot for a domestic pet such as a dog and a cat are stored in a location away from the chamberpot. The pet keeper brings a sheet from the location of sheet storage to the chamberpot, and places it on a soil bed of the chamberpot as necessary. The sheet is fixed to the soil bed by means of a plurality of clips provided peripherally of the soil bed.

With the conventional practice of storing the sheets in a separate location and bringing one of them to the chamberpot to place it on the soil bed, however, the pet keeper often forgets the sheet storing location or fails to notice the sheets having run out of stock.

A sheet may be drawn from a location adjacent the soil bed to be placed on the soil bed. Even so, the pet keeper has to take the trouble of turning up the sheet at a plurality of positions thereof after the sheet is drawn out and placed properly on the soil bed.

Thus, very cumbersome operations are needed for fixng and changing the sheet; it is difficult to change the sheet easily and quickly.

There is a further disadvantage that the sheet cannot reliably be maintained in position only by means of the clips or the like.

OBJECTS OF THE INVENTION

A primary object of the present invention is to provide a domestic pets' chamberpot which allows a sheet to be changed easily and quickly and to be placed and maintained on the soil bed reliably without becoming loose.

Another object of the invention is to provide a domestic pets' chamberpot including a sheet containing section with a transparent or semitransparent lid for allowing the amount of sheet stored therein to be checked visually from outside.

Other objects of the present invention will be apparent from the following description of a preferred embodiment.

BRIEF DESCRIPTION OF THE DRAWINGS

The drawings show an embodiment of the present invention, in which.

DETAILED DESCRIPTION OF THE PREFERRED EMBODIMENT

Figure 1:
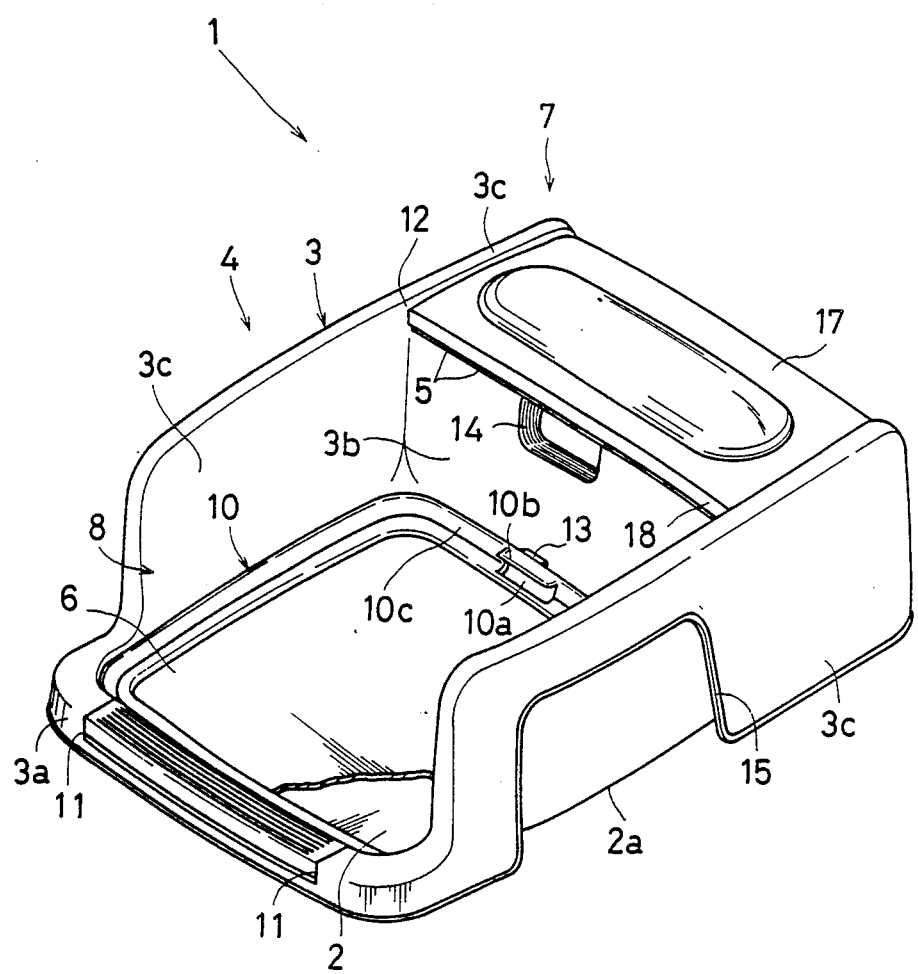
FIG. 1 is a perspective view of a chamberpot for domestic pets.

An embodiment of the present invention will be described in detail hereinafter with reference to the drawings.

Referring to FIGS. 1 through 4, a domestic pets' chamberpot 1 comprises a bed section 4 and a sheet containing section 7. The bed section 4 includes a soil bed 2 formed of a plastic material, and peripheral walls 3 surrounding the soil bed 2 and formed of the same plastic material. The sheet containing section 7 is formed integrally with and rearwardly of the bed section 4 for storing a water-absorptive sheet 6.

The sheet 6 used herein is a continuous rolled sheet having roulette markings as at 5 with intervals corresponding to the length of soil bed 2.

The peripheral walls 3 of the bed section 4, as shown in FIG. 1, include a front wall 3a, a rear wall 3b and opposite side walls 3c which are integral with and extend upwardly from the four side edges of the soil bed 2 defining a square bottom.

Of the peripheral walls 3 formed integral with the four sides of the soil bed 2, the front wall 3a has a less height than the other walls to define an entrance 8 for allowing a pet, i.e. a cat or a dog, to enter and exit the chamberpot 1 with ease. The front wall 3a is outwardly curved from its top, with a lower end thereof level with an undersurface 2a of the soil bed 2.

To this front wall 3a is hinged a presser frame 10 to be openable and closable.

Figure 2:
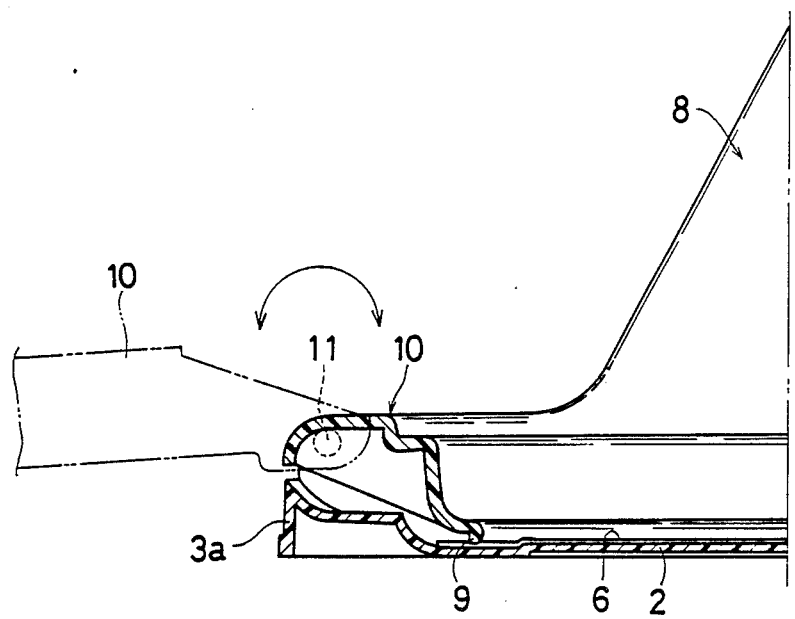
FIG. 2 is a sectional view of a front wall of the chamberpot.

More particularly, the presser frame 10 has a configuration corresponding to the peripheral edges of the soil bed 2, and is connected to the front wall 3a through hinges 11 as shown in FIGS. 1 and 2. The presser frame 10 includes a sheet pressing portion 9 extending along an entire bottom face thereof for pressing the sheet 6 on the soil bed 2 as shown in FIGS. 2 and 3.

Figure 3:
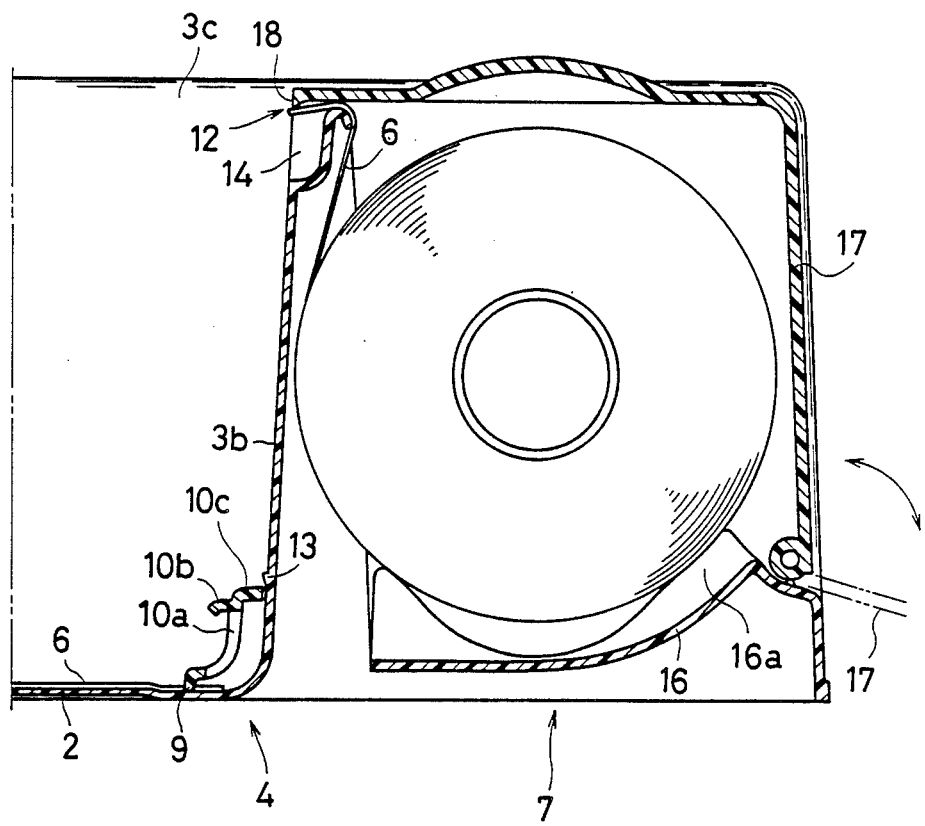
FIG. 3 is a sectional view of a rear wall and a sheet containing section.

As shown in FIG. 3, the presser frame 10 defines a cutout 10a in a vertically intermediate position intermediate between opposite ends of a free side opposite the hinges 11, and a handle 10b extending forwardly from the top of the cutout 10a to facilitate opening and closing of the frame 10.

The rear wall 3b extending upwardly from the rear edge of the soil bed 2 has a single wall structure with a top edge thereof slightly curved outwardly to define a sheet draw-out portion 12.

The rear wall 3b includes a projection 13 formed at a position opposed to the handle 10b of the presser frame 10 for engaging the frame 10.

Further, the rear wall 3b defines an opening 14 recessed rearwardly at a transversely intermediate top position thereof to facilitate sheet draw-out.

As shown in FIG. 1, the side walls 3c extending upwardly from the opposite side edges of the soil bed 2 have a fore and aft length extending to the sheet containing section 7. Each of the side walls 3c has a double-wall structure, with a top edge thereof slightly higher than the rear wall 3b and bent outwardly to extend to a lower end which is level with the undersurface 2a of the soil bed 2.

Each side wall 3c having the double-wall structure includes an outer wall portion cut out in a rectangular form at an intermediate position in the fore and aft direction corresponding to the soil bed 2. These cutouts formed in the side wals 3c define holding portions 15 for carrying the chamberpot 1.

As shown in FIG. 3, the sheet containing section 7 includes a dish-shaped sheet receiver 16 curved in the fore and aft direction of the chamberpot from rear bottom ends of the side walls 3c. The sheet receiver 16 defines sheet guides 16a formed integral therewith at appropriate right and left positions for supporting the rolled sheet 6 in a manner to facilitate its rotation.

Further, a lid 17 having an approximately L-shaped section is attached to a position rearwardly and upwardly of the sheet receiver 16 to be pivotable between an open position and a closed position. The lid 17 covers the sheet containing section 7, to be substantially flush with outer peripheral surfaces of the chamberpot 1.

The lid 17 is wholly or partly formed of a transparent or semitransparent plastic material, with a top deck projecting in an arcuate sectional shape. The lid 17 has a forward edge defining a transverse cutting blade 18 having a triangular sectional shape extending downwardly for cutting the sheet 6.

The illustrated embodiment having the foregoing construction is operable as follows:

In using this pets' chamberpot, the rolled sheet 6 is first placed in the sheet containing section 7 as supported by the sheet guides 16a of the sheet receiver 16 as shown in FIG. 3.

Figure 4:
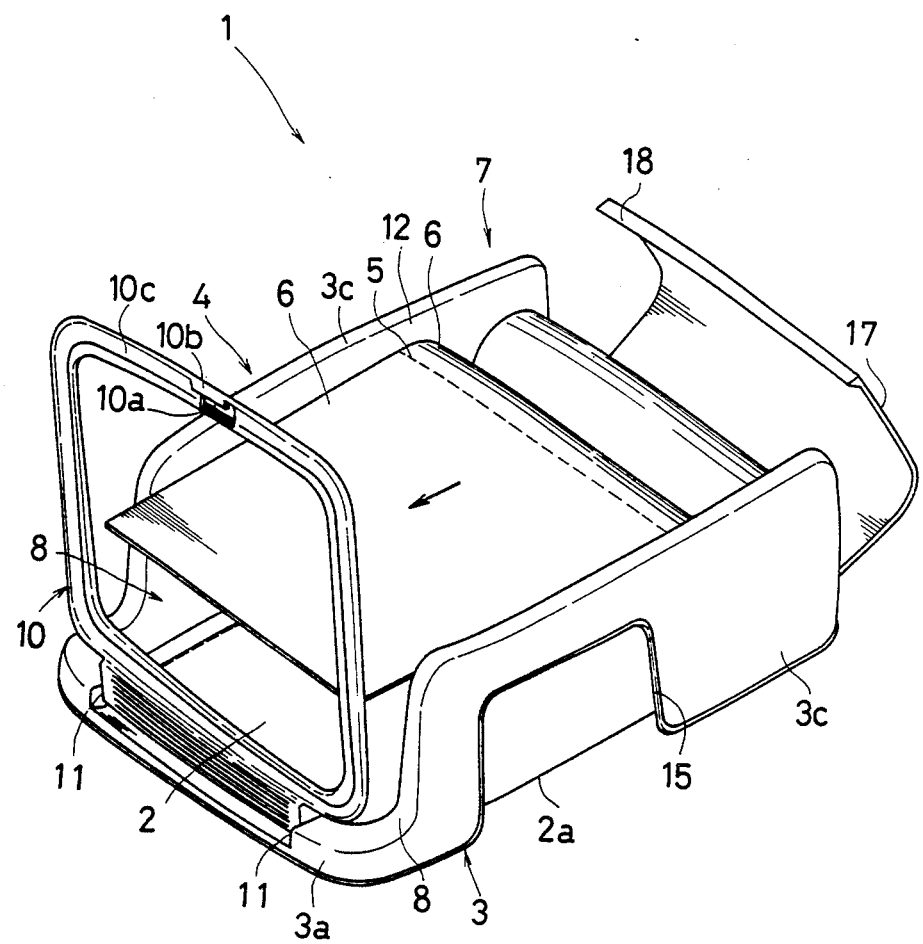
FIG. 4 is a perspective view showing how a sheet is drawn for use in the chamberpot.

Next, as shown in FIG. 4, the presser frame 10 of the bed section 4 is opened, and the leading end of sheet 6 is drawn from the sheet containing section 7 forwardly to the bed section 4.

At this time the sheet 6 is drawn a length up to a roulette marking 5 formed in advance. Thereafter the open lid 17 is closed as shown in FIG. 1.

The sheet 6 is cut off at the cutting blade 18 while the lid 17 is pressed from above, and is just placed on the soil bed 2.

Subsequently, the open presser frame 10 is lowered into engagement with the engaging projection 13. In this position the sheet pressing portion 9 extending along the entire bottom face of the frame 10 presses and clamps peripheries of the sheet 6 placed on the soil bed 2.

For changing the sheet 6, the presser frame 10 clamping the sheet 6 is lifted by using a fingertip to hold the handle 10b above the cutout 10a formed on the presser frame 10. The sheet 6 is removed after the presser frame 10 is fully opened.

Thereafter, the fingertip is inserted into the sheet-drawing opening 14 formed in the rear wall 3b to cause the lid 17 to pivot outwardly. Then the sheet 6 is drawn out through the sheet draw-out portion 12. The sheet is placed on the soil bed 2 in the same sequence as described above.

Thus, the sheet 6 is drawn from the sheet containing section 7 adjacent the soil bed 2, and is placed on the soil bed 2 lying in the direction in which the sheet 6 is drawn. This construction allows the sheet 6 to be drawn out with ease, and to be changed frequently with little trouble, which produces excellent hygienic results for dogs and cats.

The remaining amount of sheet 6 may be checked at a glance through the lid 17 formed of a transparent or semitransparent material. This allows the pet keeper to replenish the sheet 1 without fail.

The sheet 6 drawn out and placed on the soil bed 2 is fixed in position by pressing the peripheries of the sheet 6 with the presser frame 10 from above. The sheet 6 is thus securely fixed promptly and reliably only by turning the presser frame 10. There is no need to take the trouble of folding back the sheet 6 to fix it in position as heretofore practiced.

According to the present invention, the sheet containing section 7 is provided adjacent the soil bed 2 on which the sheet 6 is to be placed, as described above. This avoids the inconveniences of the prior art, such as the pet keeper forgetting where the sheet 6 is stored or failing to notice that the sheet 6 has run out of stock. Since the sheet 6 is kept readily available, a sheet changing operation may be carried out quickly and easily.

The sheet 6 placed on the soil bed 2 is fixed by pressing the peripheries of the sheet 6 with clamp means frame-shaped to correspond to the peripheries of the soil bed 2, namely the presser frame 10. Thus, the clamp means may simply be applied to the peripheries of the sheet 6 drawn to the soil bed 2. There is no need to turn up the sheet at positions thereof corresponding to clips as in the prior art.

Moreover, since the sheet 6 is peripherally fixed with the above frame-shaped clamp means (presser frame 10), the sheet ends which might cause the sheet 6 to become loose are not exposed. The sheet 6 thus reliably remains fixed in position without becoming loose even when a pet such as a dog or a cat walks about in the chamberpot.

The present invention is not limited to the construction described hereinbefore.

While, in the foregoing embodiment, the sheet containing section 7 is formed integral with the bed section 6, the two sections may be formed separately from each other. The sheet 6 may be stored in the sheet containing section 7 as folded zigzag instead of being in a rolled form.

The sheet pressing portion 9 defined on the entire bottom face of the presser frame 10 may be provided only at selected parts thereof instead. Further, the presser frame 10 may be fitted to the peripheral walls 3 from above, instead of being hinged to one of the peripheral walls 3 as described.

What is claimed is:

1. A chamberpot for domestic pets employing a water-absorptive sheet as placed on a soil bed surrounded by peripheral walls, said chamberpot comprising;
    a sheet containing section continuous with one of the peripheral walls for storing said sheet in a manner to allow the sheet to be drawn therefrom,
    said one of the peripheral walls defining a sheet draw-out position for guiding the sheet from said sheet containing section to said soil bed, and
    clamp means having a frame shape corresponding to said soil bed and defining a sheet pressing portion on a bottom peripheral face thereof for pressing the sheet on peripheries of said soil bed.

2. A chamberpot as claimed in claim 1, wherein said sheet containing section includes a lid formed of a transparent or semi-transparent plastic material for opening and closing said sheet containing section.

* * * * *